Patented Nov. 13, 1945

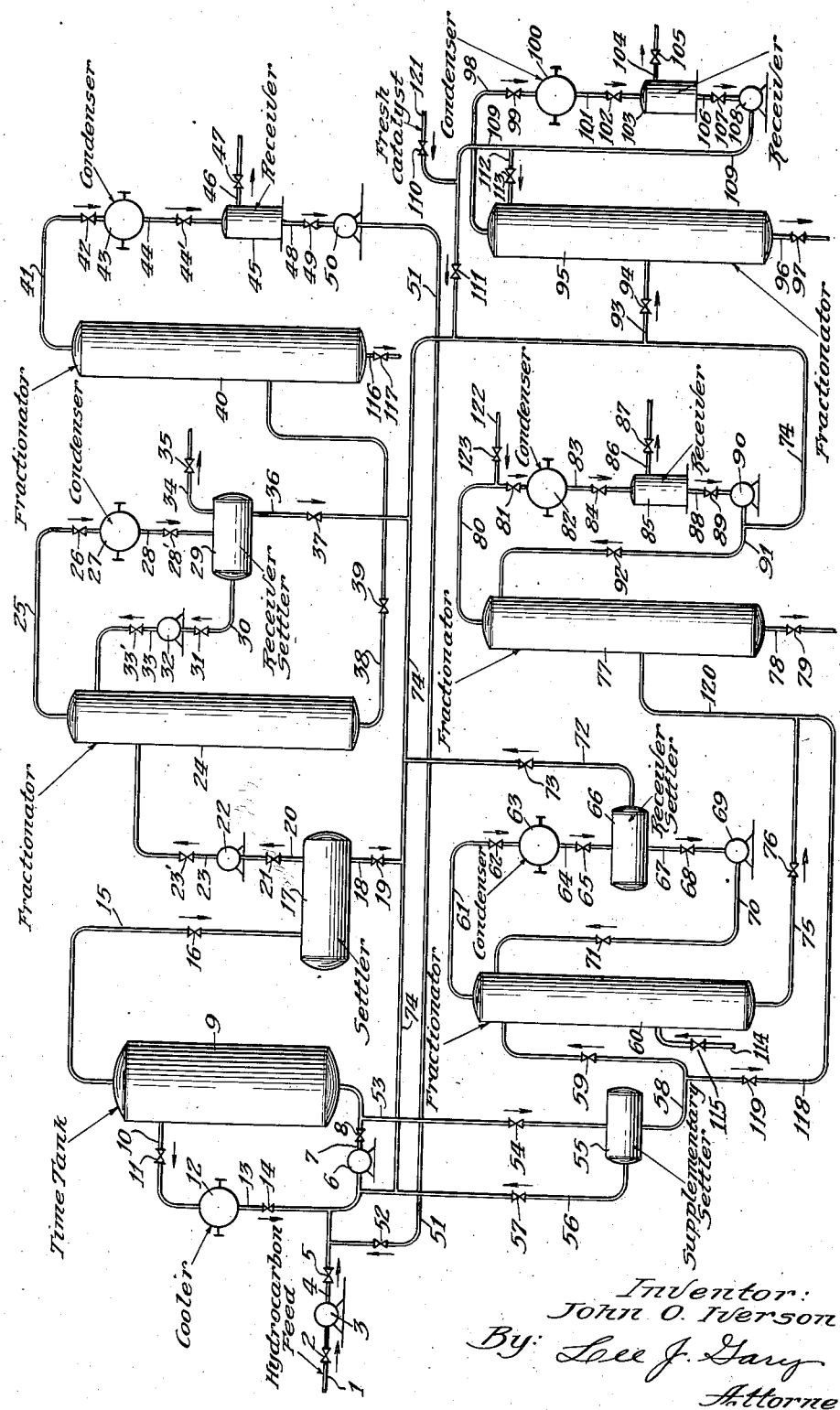

2,388,919

UNITED STATES PATENT OFFICE 2,388,919

HYDROGEN FLUORIDE ALKYLATION PROCESS

John O. Iverson, Chicago, Ill., assignor to Universal Oil Products Company, Chicago, Ill., a corporation of Delaware Application September 21, 1942, Serial No. 459,110

3 Claims. (Cl. 260—683.4)

This is a continuation-in-part of my co-pending application Serial No. 404,607, filed July 30, 1941.

This invention relates to an improved process for the alkylation of hydrocarbons, e. g. isoparaffins with olefins, in the presence of a hydrogen fluoride catalyst. The invention is more particularly concerned with an improved method for conducting the regeneration of used hydrogen fluoride catalyst.

The reaction of isoparaffins with olefins to produce higher molecular weight isoparaffinic hydrocarbons is a well-known method for the manufacture of high antiknock motor fuels. Various catalysts such as a metal halide with a halogen halide promoter, phosphoric acid, and sulfuric acid have been proposed for this reaction. However, catalysts which contain hydrogen fluoride as their essential active ingredient possess considerable advantage over any of the previously suggested catalysts. For example, when using a hydrogen fluoride catalyst the alkylation reaction may be conducted at a substantially higher temperature than it is feasible with sulfuric acid catalysts which induce undesirable side reactions at higher temperature. Moreover, hydrogen fluoride which dissolves in the hydrocarbon reaction products may be recovered readily and returned to the process for reuse. Furthermore, the used hydrogen fluoride catalyst may be subjected to a simple and easily controlled regeneration process whereby purified hydrogen fluoride catalyst may be recovered and returned to the alkylation zone for reuse.

Substantially anhydrous hydrogen fluoride is ordinarily charged to the alkylation process but after a period of use the catalyst becomes contaminated with water and organic material which decreases the effective hydrogen fluoride concentration to such an extent that the alkylating activity of the catalyst begins to decline. By withdrawing a portion of the contaminated catalyst from the system either intermittently or continuously and replacing the withdrawn catalyst with fresh or regenerated catalyst of higher hydrogen fluoride concentration it is possible to maintain the desired level of catalyst activity. Regeneration of the contaminated catalyst may be most readily accomplished by a heating and distillation step or steps. The catalyst may be introduced into a first fractionating column wherein an overhead stream comprising hydrogen fluoride, water, and light hydrocarbons is separated from a bottoms product which consists largely of higher boiling organic materials and polymers. A portion of the overhead stream containing hydrogen fluoride may be returned directly to the alkylation step while another portion is preferably subjected to a water removal step and the "dried" hydrogen fluoride is also returned to the alkylation step. The water removal is readily effected by subjecting a portion of the overhead hydrocarbon - hydrogen fluoride - water stream to fractionation in a second fractionating column. Substantially anhydrous hydrogen fluoride may be recovered overhead while a hydrogen fluoride-water mixture is withdrawn from the bottom of the fractionating column.

It is the principal object of the present invention to overcome certain difficulties which are inherent in the above described method of regenerating used hydrogen fluoride catalyst.

In one specific embodiment the present invention comprises an improved process for the regeneration of a used hydrogen fluoride catalyst which includes the steps of subjecting the used hydrogen fluoride catalyst to a first fractionation wherein light hydrocarbons are removed overhead, subjecting the bottoms product from said first fractionation to a second fractionation step operated at a substantially lower pressure wherein an overhead distillate comprising essentially hydrogen fluoride and water is separated from a bottoms product comprising essentially higher boiling hydrocarbons, returning a portion of said last mentioned overhead distillate to the catalytic reaction step, subjecting another portion of said last mentioned overhead distillate to a third fractionation step wherein substantially anhydrous hydrogen fluoride is removed overhead from a bottoms product comprising a hydrogen fluoride-water mixture, and returning said substantially anhydrous hydrogen fluoride to the catalytic reaction step.

When a used hydrogen fluoride catalyst is regenerated by fractionation to separate hydrogen fluoride and water from higher boiling organic contaminants, considerable difficulty is often experienced because the used catalyst usually contains appreciable amounts of dissolved lower boiling hydrocarbons. In the fractionation step these high vapor pressure hydrocarbons are distilled over with hydrogen fluoride and water, and as a result it is necessary to employ substantially high pressures, e. g. of the order of 100 pounds per square inch, in the condensing and fractionating system in order to effect condensation of the mixture at ordinary cooling water temperatures. As a result of these higher pressures, the reboiler temperature in the fractionating column may be appreciably higher than is necessary to effect decomposition of the organic complexes in the used catalyst and larger reboiler surfaces may be required. Moreover, the danger of severe corrosion difficulties is increased by the use of higher temperatures.

Several methods may be employed to circumvent this difficulty, e. g. the used catalyst to be regenerated may first be scrubbed or contacted with a heavier hydrocarbon or hydrocarbon fraction which will extract the dissolved lower boiling hydrocarbons.

Another method which may be employed consists in adding a higher boiling hydrocarbon or other material to the overhead stream from the regenerating fractionator whereby the high vapor pressure caused by the pressence of light hydrocarbons is counteracted at least in part and the total vapor pressure of the mixture is sufficiently decreased to permit condensation without maintaining undesirably high pressures in the condensing system. The heavier hydrocarbon to be added may conveniently comprise the alkylation reaction products or any desired fraction thereof, e. g., the fraction boiling above 300° F.

In the present invention, however, the difficulty caused by the presence of dissolved light hydrocarbons in the contaminated catalyst is overcome largely by the use of an additional fractionating step as hereinafter described in greater detail. The used catalyst is first subjected to fractionation for the recovery overhead of light hydrocarbons only, although a relatively small proportion of hydrogen fluoride will usually be distilled over with the light hydrocarbons. The residual mixture comprising hydrogen fluoride, water, and organic contaminants is withdrawn from the bottom of this fractionating column and, being substantially free of dissolved light hydrocarbons, it is now subjected to regeneration by fractional distillation in the manner hereinbefore described but at a substantially lower pressure and without the complications which arise when light hydrocarbons are present in the overhead distillate.

The accompanying drawing is a diagrammatic illustration of an arrangement of apparatus suitable for conducting the present invention. Further advantages and modifications of my invention will become more apparent in the following description of the drawing.

Vessel 9 shown in the drawing is the alkylation reaction zone of the system and comprises in this case a so-called "time tank" containing a plurality of orifices or internal baffles designed to produce turbulent mixing of the reactants and catalyst. It will be apparent that any convenient form of apparatus may be employed as a reaction zone, for example, a mechanically agitated reaction zone. It is only necessary that the reaction zone provide sufficient agitation to obtain intimate contacting of the hydrocarbons and catalysts.

Referring to the drawing, a hydrocarbon charge which may comprise essentially isobutane, butylenes and normal butane is passed as a liquid under pressure through line 1, valve 2, and charge pump 3 to line 4. The charge is combined in line pump 3 to line 4 with a recycled isobutane fraction from line 51. The combined feed from line 4 is then admitted to line 13 containing a recirculating emulsion of hydrogen fluoride and hydrocarbons. The resultant commingled mixture is then passed through pump 6, line 7 and valve 8 to time tank 9, in which the interaction of olefinic and isoparaffinic hydrocarbons is substantially completed. A large portion of the emulsion of hydrocarbons and hydrogen fluoride from time tank 9 is withdrawn through line 10 and valve 11, through cooler 12, wherein a portion of the heat of reaction is removed and thence through line 13 and valve 14 into recirculating pump 6. The combination of time tank 9 with the emulsion recirculating system comprises the reaction zone.

A smaller portion of the emulsion of hydrocarbon and hydrogen fluoride from time tank 9 passes through line 15, valve 16 to alkylation settler 17, wherein hydrogen fluoride catalyst is settled out into a lower layer and withdrawn through line 18 and valve 19 as shown later. The hydrocarbon from alkylation settler 17 passes through line 20, valve 21, pump 22, and line 23 containing valve 23' to fractionator 24. The vapors from fractionator 24 pass through line 25 and valve 26, condenser 27, and line 28 containing valve 28' to receiver 29. This fractionation column removes the propane and dissolved hydrogen fluoride from the product. However, it is necessary to supply substantially large amounts of reflux in order to remove all of the dissolved hydrogen fluoride. This reflux is returned from receiver 29 through line 30, valve 31, pump 32 and line 33 containing valve 33' to the upper portion of fractionator 24. Any gaseous propane that may be present may be removed through line 34 and valve 35. The hydrogen fluoride which separates as a heavy lower layer in the bottom of receiver 29 will be withdrawn through line 36 and valve 37 to be returned to the process as shown later.

The reflux condensate from fractionator 24 is withdrawn through line 38 and valve 39 and directed to a second fractionation step in fractionator 40. From this fractionation the overhead product, consisting mainly of isobutane, is withdrawn through line 41, valve 42, condenser 43, line 44 and valve 44' to receiver 45. Any non-condensable gases present will be removed through line 46 and valve 47. The liquid isobutane passes through line 48, valve 49, pump 50, line 51, and valve 52 to the beginning of the process where it is combined with the charge in line 4. A product consisting of n-butane and alkylate is withdrawn through line 116 and valve 117.

In order to maintain the catalyst activity in the reaction system, a small portion of the catalyst is continuously regenerated as hereinafter described. A stream of hydrocarbon and hydrogen fluoride emulsion is withdrawn from emulsion circulating line 7 through line 53 and valve 54 to a supplementary emulsion settler 55, wherein the hydrogen fluoride settles out. The hydrocarbon layer substantially freed from hydrogen fluoride is returned to the reaction zone through line 56 and valve 57. Hydrogen fluoride catalyst containing organic contaminating materials is passed from emulsion settler 55 through line 58 and valve 59 to fractionator 60 wherein low boiling hydrocarbons and, in some cases, a small amount of hydrogen fluoride are taken overhead through line 61, valve 62, condenser 63, line 64 and valve 65 to receiver 66. The hydrocarbon condensate in receiver 66 is withdrawn though line 72 containing valve 73 and is then introduced into line 74 whereby it may be returned to the alkylation step. This hydrocarbon condensate stream will usually be substantially saturated with hydrogen fluoride.

Any hydrogen fluoride which is distilled overhead from column 60 and is present in excess of that dissolved in the stream removed through line 72 will be separated out and may be withdrawn through line 67 containing valve 68 and returned by gravity or by pump 69 through line 70 and valve 71 to column 60 as reflux. Ordinarily column 60 will be operated at a pressure only slightly lower than the discharge pressure of pump 6, for example, about 150 pounds per square inch.

In certain cases it may be desirable to introduce isobutane or other isoparaffins from an extraneous source into column 60 at some point below the catalyst feed inlet, for example, through line 114 and valve 115, in order to aid in the regeneration of the catalyst and in the decomposition of the organic complexes contained in the used catalyst. The temperature of the liquid in the column bottoms and the time of residence can be adjusted to control the extent of regeneration accomplished in this column. The isobutane reacts with the hydrogen fluoride complexes such as alkyl fluorides, and higher boiling alkylation products are obtained which are withdrawn through line 75 and eventually are withdrawn in the organic diluent stream removed from column 77 through line 78. The released hydrogen fluoride is recovered overhead from column 77. In certain cases it may be desirable to remove the dissolved light hydrocarbons from only a portion of the catalyst to be regenerated in which instance part of the catalyst layer from settler 55 passes through line 58, line 116, valve 119, and line 120 to column 77.

When the low boiling hydrocarbons dissolved in the used catalyst comprises appreciable quantities of isobutane, a portion or all of this isobutane may react with the used catalyst in column 60 in the manner above described and thus be converted to higher boiling constituents which will not distill overhead during the final regeneration of the used catalyst. Other dissolved light hydrocarbons present may be removed overhead in column 60. It may be desirable under certain circumstances to replace or supplement column 60 with a reaction zone of any convenient type wherein reaction or "soaking" time is provided at appropriate temperatures to effect conversion of the dissolved low boiling hydrocarbons to higher boiling materials which will not distill overhead when the catalyst is regenerated by subsequent fractionation.

The bottoms product from column 60 is withdrawn through line 75 containing valve 76 and is introduced through line 120 into fractionating column 77, wherein substantially complete regeneration or any desired degree of regeneration of the contaminated catalyst is accomplished. This column may be operated at some lower pressure than column 60 and at a temperature such that all the hydrogen fluoride and water mixture is completely vaporized and the organic complexes such as organic fluorides are decomposed leaving only a high boiling polymer-like hydrocarbon to be withdrawn through line 78 and valve 79 as a bottoms product. The overhead distillate from column 77 passes through line 80, valve 81, condenser 82, line 83 and valve 84 to receiver 85. Non-condensable gases may be vented through line 86 and valve 87. The liquid condensate from receiver 85 is withdrawn through line 88 and valve 89 to pump 90 whereby a portion of the condensate may be returned through line 91 and valve 92 to column 77 as reflux. Part of the purified liquid hydrogen fluoride is withdrawn from line 91 through line 74 and is then divided into two streams, the one passing through line 93 and valve 94 to fractionator 95, and the other continuing through line 74 into line 56 to be recycled to the alkylation stage of the process. The method hereinbefore described of adding a heavier hydrocarbon to the overhead distillate from column 77 in order to reduce the vapor pressure of said distillate may also be employed by introducing the heavy material through line 122 and valve 123.

In fractionator 95, any water that is present in the hydrogen fluoride is removed in the reflux condensate as a mixture, usually an azeotropic or constant boiling mixture, of water and hydrogen fluoride through line 96 and valve 97. Dry hydrogen fluoride is withdrawn overhead from fractionator 95 through line 98, valve 99, condenser 100, line 101, and valve 102 to receiver 103. Provision is made for the removal of any non-condensable gases from this receiver through line 104 and valve 105. The purified and dried liquid hydrogen fluoride passes through line 106, valve 107, pump 108, line 109 and valve 111 to line 74 to be returned to the reaction zone. A portion of the hydrogen fluoride is returned to the column as reflux through line 112 and valve 113. The combined streams of hydrogen fluoride from lines 106, 36, and 18 are returned through line 74 and line 56 to line 18 and the reaction zone. Fresh hydrogen fluoride catalyst may be added when necessary through line 121 and valve 118.

It will be apparent that the feature of my invention resides in an improved method for the regeneration of contaminated hydrogen fluoride catalyst. Therefore, it is not intended to limit the alkylation reaction system proper to any particular arrangement of apparatus. The fractionation of the reaction products and the recovery of dissolved hydrogen fluoride may be effected in numerous modifications of the flow shown in the drawing.

By the term hydrogen fluoride catalyst, which is used throughout this specification and appended claims it is intended to include catalysts whose essential active ingredient is hydrogen fluoride. It is within the scope of my invention, therefore, to employ hydrogen fluoride which contains minor amounts of other substances, for example, water or promoters such as boron trifluoride. Although usually commercial "anhydrous" hydrogen fluoride will be utilized in the alkylation process, it is permissible to have as high as about 10% water present in the catalyst. Excessive dilution with water must be avoided, however, since it will result in a decline in the alkylating activity of the catalyst.

The alkylation of isoparaffins with olefins in the presence of a hydrogen fluoride catalyst is effected at temperatures of the order of from about 0° F. to about 200° F. although a more preferable range is from about 50° F. to about 150° F. Under certain circumstances even lower temperatures may be employed. The pressure in the alkylation zone is ordinarily maintained sufficiently high to insure substantially liquid phase operation. The time relationship may be expressed by means of the so-called "space time" which is defined as the volume of catalyst within the contacting zone divided by the volume rate per minute of hydrocarbon reactants charged to the zone. Usually the space time will fall within the range of from about 5 to about 80 minutes although in certain cases it may be desirable to extend this range in either direction. As is well-known in the alkylation art an excess of isoparaffins over olefins should be maintained in the alkylation zone at all times, e. g., from about 4:1 or 5:1 to about 10:1 or even higher.

I claim as my invention:

1. In the alkylation of isoparaffins with olefins in the presence of a hydrogen fluoride catalyst wherein contaminated catalyst is removed from the alkylation system and subjected to regeneration for the recovery of purified hydrogen fluoride suitable for reuse in the alkylation step, the improvement which comprises fractionating said contaminated hydrogen fluoride in a first fractionation zone for the separation of low boiling hydrocarbons dissolved in said contaminated catalyst, subjecting the bottoms product from said first fractionation step to further fractionation in a second fractionation step wherein an overhead distillate comprising essentially hydrogen fluoride and water is separated from a bottoms product comprising essentially higher boiling hydrocarbons, returning a portion of said overhead distillate to the alkylation step, subjecting another portion of said overhead distillate to fractionation in a third fractionation step wherein substantially anhydrous hydrogen fluoride is removed overhead from a bottoms product comprising a hydrogen fluoride-water mixture, and returning said substantially anhydrous hydrogen fluoride to the alkylation step.

2. The process of claim 1 wherein said separated low boiling hydrocarbons are returned to the alkylation step.

3. The process of claim 1 wherein said second fractionation step is operated at a substantially lower pressure than said first fractionation step.

JOHN O. IVERSON.